3,440,799
GAS SCRUBBER
Dag Romell, Ronnbackegatan 72, Malmo, Sweden
Continuation of application Ser. No. 630,245, Apr. 12, 1967. This application June 27, 1968, Ser. No. 742,982
Int. Cl. B03c 3/01, 3/38
U.S. Cl. 55—107                              7 Claims

ABSTRACT OF THE DISCLOSURE

A gas scrubber utilizing, for separating dust from a gas, electrically charged particles of a washing liquid which are mixed with the gas within an enclosure having an inlet and an outlet for the gas, said device comprising means for ejecting the washing liquid by means of nozzles having essentially the same electric potential as the enclosure, and means electrically insulated from said enclosure as well as from said nozzles and arranged relative to jets of liquid ejected from said nozzles so as to by electric influence to apply to drops formed from jets if the ejected liquid a high electric potential relative to the enclosure and the nozzles in accordance with the principles of the Kelvin influence electricity machine.

---

This is a continuation of application Ser. No. 630,245, filed Apr. 12, 1967, now abandoned.

BACKGROUND OF THE INVENTION

In the art of removing dust from gases so-called scrubbers are well-known, in which the gas from which dust is to be separated is brought into intimate contact with a liquid, usually water, while, to enhance the interaction between gas and liquid, the active surface of the liquid is increased by injecting it into the gas flow as jets or curtains in which the liquid is distributed in form of small drops.

Furthermore, electro-filters are known for precipitating dust from gases, in which the dust particles, after having been charged to high voltage by means of corona discharge, is removed from the gas by aid of electrical forces.

Finally, combinations of scrubbers and electrofilters are known, in which the gas from which dust is to be separated is bright into contact with jets of liquid drops brought to high electric potential by means of applying to nozzles, from which the charged drops are ejected, a high electric potential.

The invention relates to an apparatus in which charged liquid particles are used to separate dust and gas, which eliminates the necessity of keeping the nozzles through which the liquid is ejected at a high electric potential, the means required for keeping such nozzles on high electric potential being a severe disadvantage of the known devices of this kind.

SUMMARY OF THE INVENTION

A gas scrubber apparatus comprises within an enclosure a gas duct extending between a gas inlet and a gas outlet, and ejection means for ejecting gas washing liquid into said duct. According to the invention the apparatus comprises at least one first electrically conducting body and at least one second electrically conducting body, located at a distance from the first electrically conducting body. The ejection means, which are arranged to eject at least two individual jets of gas washing liquid, such as water, are electrically connected to the enclosure of the apparatus and said first and said second electrically conducting bodies are electrically insulated from the enclosure and from each other. The ejection means and the electrically conducting bodies are mutually arranged to bring a first one of said jets, when ejected, to first pass by a first electrically conducting body at a distance therefrom and to bring at least part thereof thereafter to impact said second electrically conducting body electrically insulated from said first electrically conducting body, and to bring a second one of said jets to first pass by said second electrically conducting body at a distance therefrom and to bring at least part thereof thereafter to impact said first electrically conducting body, the jets and said first and said second electrically conducting bodies thus together constituting a Kelvin liquid influence machine, said gas duct extending through a space passed by at least one of said jets after having passed at least one of said electrically conducting bodies.

BRIEF DESCRIPTION OF THE DRAWING

The invention will become more fully apparent from the following description of embodiments thereof as illustrated in the accompanying drawing, in which:

In FIG. 1, 1 is an enclosure forming a chamber 2 for the gas to be cleaned and having an inlet 3 and an outlet 4. Within a compartment 5, separated from the duct 2 by a partition wall 6, the enclosure contains an apparatus for applying to jets 7 and 8 of an electrically conducting gas washing liquid, such as water, ejected through nozzles 9 and 10, respectively, which are connected to a supply duct 11 for the liquid from a washing liquid source, not illustrated.

Figure 1:
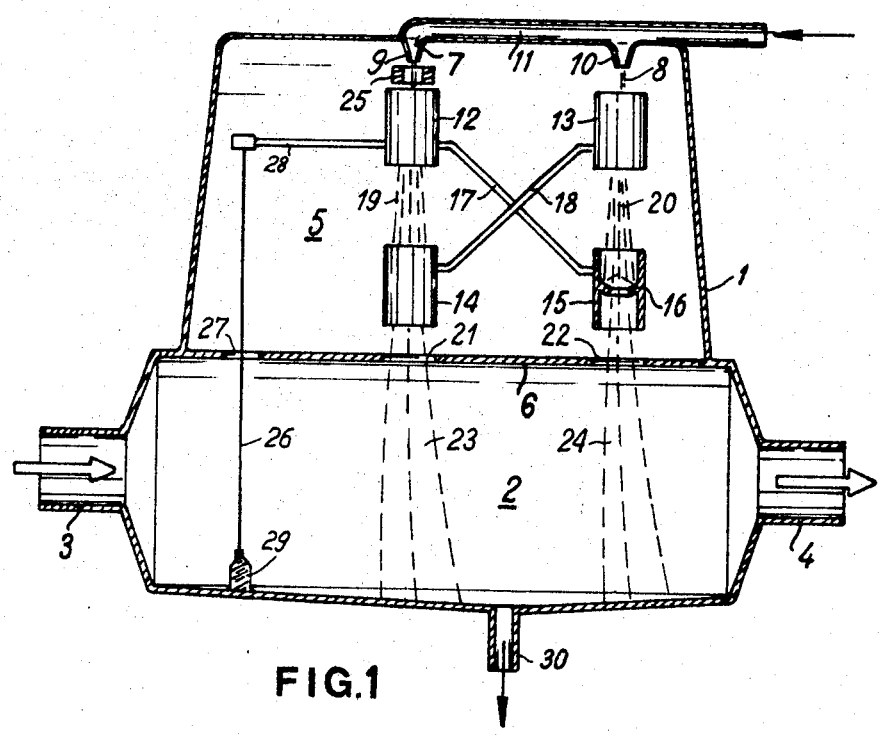
FIG. 1 is a longitudinal vertical sectional view of a first embodiment of the invention showing a gas chamber having an outlet and an inlet for the gas from which dust is to be separated and comprising means for applying a high electric potential to liquid drops ejected into the gas chamber.

The means for applying to drops of liquid originating from the jets 7 and 8 a high electric potential relative to the potential of the enclosure, which, in practice, is connected to ground, together constitute a Kelvin liquid influence machine, which in the embodiment illustrated consists of two groups of two electrically conducting electrodes 12, 13 and 14, 15, respectively, so arranged relative to the jets 7 and 8 that a jet after having passed a first electrode 12 or 13 of a group is at least in part impinging in the form of drops on the second electrode of the other group. As illustrated said first electrodes 12 and 13 constitute cylindrical open-ended metal shells, in the axial direction of which the jets 7 and 8, respectively, pass when ejected from the nozzles 9 and 10, respectively, and the second electrode of each group constitutes as well an open-ended cylindrical metal shell, which may, as illustrated in section for electrode 15, comprise a restriction 16 to be impinged upon by at least part of the jet passing said first electrode of the other electrode group to apply to it a charge of the potential of the jet drops. The electrodes 12 and 15 of one group as well as the electrodes 13 and 14 of the second group are by means of conductors 17 and 18 electrically interconnected.

When ejecting liquid through the nozzles 9 and 10, the jets 7 and 8 pass a first electrode 12 or 13, respectively, of each group and are, by appropriate choice of injection means and liquid pressure when passing or after having passed the respective electrodes distributed into individual drops emerging as sprays 19 and 20, respectively, from the first electrodes and, at least in part, impinging upon the second electrodes 14 or 15, respectively, of the other electrode group whereafter the liquid commences through apertures 21 and 22, respectively, into the space of the duct 2 as streams 23 and 24, respectively, of liquid drops.

When jets are ejected past electrodes arranged as described in accordance with the well-known Kelvin liquid electricity machine, the potential of the two groups of electrodes work up to high oppoiste potentials, the potentials being plus or minus on the groups depending on initial conditions. The potentials build up with a polarity at random, if not initially started with a specific polarity by applying to one of the groups a start potential of a selected polarity. Such start potentials may be applied by arranging a charge electrode adjacent one of the jets, or both, and, in the latter case, obviously of opposite polarities. In FIG. 1, 25 is an electrete, the electric field of which influences the jet 7 to apply thereto a potential for starting the Kelvin influence machine in a selected direction as to the polarities of the electrodes.

Assuming that initially the electrode group 12, 15 obtains a positive potential said potential influences the jet of electrically conducting washing liquid, the ejection means being so designed that the ejected liquid proceeds as an uninterrupted jet along at least part of the distance past the electrode 12, thus causing a polarisation of the jet, in that the liquid adopts a negative charge, while the corresponding positive charge is drained to earth via the uninterrupted jet and the supply tube 11. The negative charge applied to the liquid is transferred by the jet portion 19 in which the jet is distributed in negatively charged drops, of which a part impinges upon the second electrode 14 of the other electrode group 13, 14, applying to it a charge of negative potential, part of which is transferred to the first electrode 13 of this group by the lead 18, the electrode 13 thus as well adopting a negative potential. Correspondingly, drops of the jet portion 20 apply to the second electrode 15 of the first group 12, 15 a positive charge and potential. The electrodes 12, 13 and 14, 15 of the two groups thus hold positive and negative potentials, respectively, the apparatus thus continuously delivering energy originating from the jets.

Adjacent the entrance part of the chamber 2, the device comprises a corona discharge electrode, as illustrated consisting of one or more conducting wires 26 extending through an aperture 27 and electrically connected to the electrode group 12, 15 by a conductor 28, between which and an insulator 29 wire 26 is attached.

Dust particles carried by the gas entering through inlet 3 are, when passing the corona discharge electrode 26, charged to a positive potential and then arrive with the gas into a region in which the stream 23 of negatively charged drops originating from jet 7 enter through aperture 21. Here a majority of the dust particles are attracted by the negatively charged liquid drops and follow the drops to the bottom of the chamber 2, where they are removed with the washing liquid through a drain 30. Part of the drops with dust particles adhered thereto proceed with the gas and arrive at a region of the chamber into which enters the stream 24 of drops of opposite, in this case positive, polarity originating from jet 8, and these drops are attracted by said positively charged drops and removed therewith at the bottom of the chamber. The clean gas then leaves the chamber through outlet 4.

Figure 2:
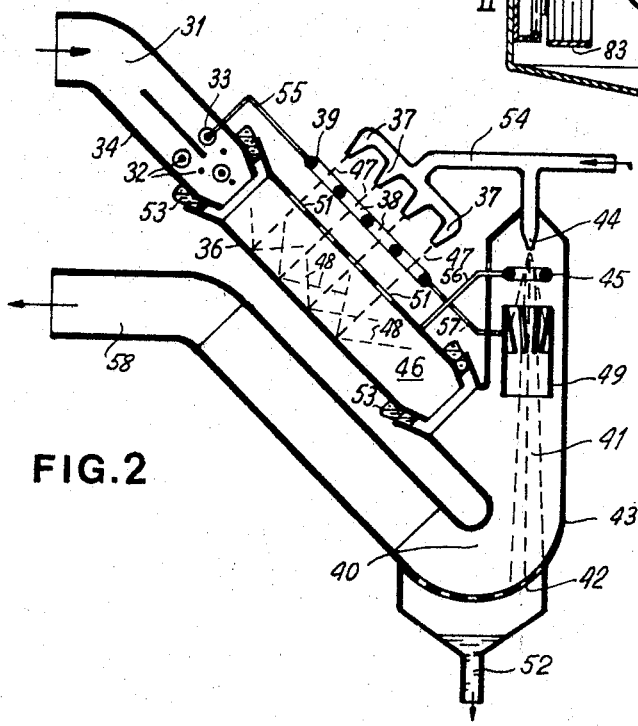
FIG. 2 illustrates a further embodiment according to the invention.

FIG. 2 schematically illustrates a further embodiment of a gas cleaner according to the invention, illustrated in a sectional view. The apparatus has an inlet duct 31 of rectangular section enclosed by a wall 34 and comprising a number of corona discharge electrodes illustrated as thin metal wires 32 supported by insulators 33 and as illustrated extending perpendicular to the plane of the drawing. Following the inlet tube 34, the apparatus comprises a channel portion 46 enclosed by an electrically conducting wall 36 and insulated from ground by means of insulators 53, the wall 36 having apertures 51 for washing liquid jets 47 originating from nozzles 37 connected to a duct 54 for washing liquid supplied under pressure from a pressurized liquid source, not illustrated.

A charging electrode 39 having apertures 38 for the jets 47 arranged between the nozzles 37 and the channel portion 46, said charging electrode 39 being electrically connected to the corona discharge electrodes 32 by means of a conductor 55. Assuming, once the apparatus has been started by ejecting liquid through the nozzles 37, a positive potential having built upon the charging electrode 39, the jets entering the channel portion 46 will carry a negative charge, bringing the channel wall 36 up to a negative potential. The nozzles 37 and the liquid ejection pressure are so selected that the jets 47, after having reached the region of the charging electrode 39 as uninterrupted jets, are divided into comparatively large drops, which hit the wall 36 opposite to the appartus 51 to be distributed as sprays 48 of small negatively charged drops which mix with the gas passing through the channel portion 46. The channel wall 36 encloses a substantially field free space, favourable for an interaction to proceed between the negatively charged liquid drops and the dust particles carried through the channel after having obtained a positive charge when passing the corona discharge electrodes 32. A substantial part of the liquid drops with dust particles adhering thereto is carried by the gas through the channel 46 and enter a following channel portion 40 enclosed by a wall 43, which is electrically in connected to ground. In this channel portion 40 the particles meet a further stream 41 of drops of washing liquid, originating from a further nozzle 44 and passing, before entering the channel portion 40, an electrode system consisting of a charging electrode 45 enclosing the jet ejected from nozzle 44 and electrically connected to channel wall 36 by a conductor 56, thus together with channel wall 36 constituting one electrode group of a Kelvin liquid influence machine.

Part of the jet ejected from nozzle 44 hits, after having passed electrode 45, a further electrode 49, which is by a lead 57 electrically connected to electrode 39 and together therewith constituting the second electrode group of the influence machine.

The comparatively large and, with the polarities selected above, positively charged drops of the stream 41 attract the negatively charged spray leaving the channel portion 46, the liquid together with the dust attracted thereby then leaving the gas channel through apertures 42 at the bottom of the duct portion 40 from which liquid and dust carried thereby is then removed through a drain 52. The clean gas leaves the apparatus through an outlet duct 58.

Figure 3:
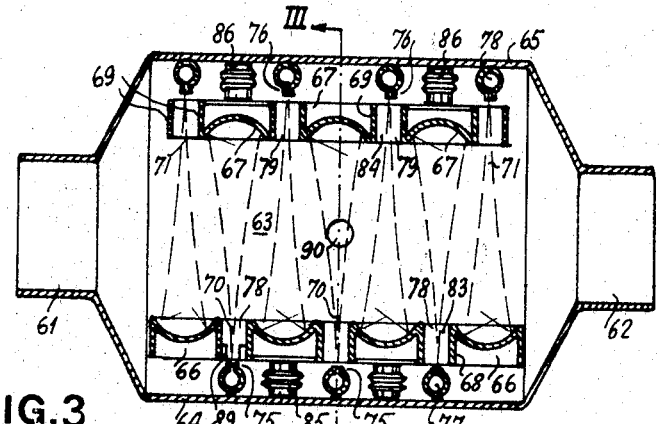
FIGS. 3 and 4 illustrate an embodiment in which means for applying a high electrical potential to liquid drops are arranged along opposite walls of a gas chamber constituting a duct for the gas to be cleaned, FIG. 3 being a horizontal section taken along the line II—II of FIG. 4 and FIG. 4 being a vertical section taken along the line III—III of FIG. 3.
Figure 4:
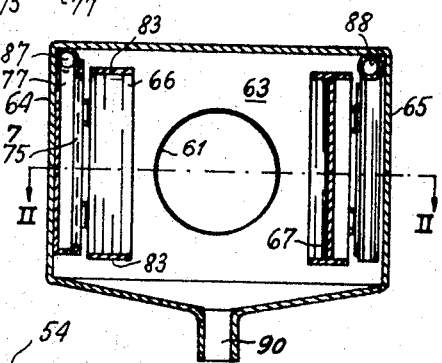

FIGS. 3 and 4 illustrate a gas scrubber according to the invention having electrodes arranged along two opposite walls of a dust separating chamber 63 or rectangular cross section, having a gas inlet 61 and a gas outlet 62. Along each one of two opposite walls 64 and 65, a row of electrodes 66 and 67, respectively ,extends, in each of which the electrodes extend vertically along the adjacent wall. Parallel edges of adjacent electrodes are located at a distance from each other to allow for a jet 70 and 71, respectively, of washing liquid, having, for instance, the shape of a curtain extending along the gap between edges of adjacent electrodes and originating from nozzles 75 and 76, respectively, of a vertical liquid supply tube 77 or 78, respectively, attached to the chamber wall rearwardly of the electrodes. The nozzles and the electrodes are mutually so arranged, that the jet, when ejected between two electrodes of one row each hit the surface of an opposite electrode, a jet 70, for instance, ejected through the gap between two electrodes 66 hitting an opposite electrode 67. The electrodes 66 and 67 are equipped with flat edge portions 68 and 69, respectively, between which channels 78 and 79, respectively, for the jets extend. As illustrated, the electrodes 66 and 67, respectively, of a row are electrically and mechanically interconnected by electrically conducting members 83 and 84, respectively, to constitute each one electrode group extending along an enclosure wall. The electrode groups are supported by insulators 85 and 86, respectively, attached to the enclosure wall.

When supplying an electrically conducting washing liquid to the nozzles 75 and 76 from a liquid source, not illustrated, through supply tubes 87 and 88, respectively, to form jets which extend unbroken at least along part of the edge plates 68 and 69, respectively, of the electrodes to then be distributed into separate drops, the drops assume an electric charge when passing the electrodes and then hit on an opposite electrode, where they are in part split up into small charged particles which fill up the adjacent space and are brought forward by the gas flowing through the chamber. When injecting the liquid in the manner described, electrical charges are generated due to always present irregularities, the potentials building up until a state of equilibrium is reached, in which one of the groups of electrodes, the electrodes 66 for instance, adopt positive potential, while the second electrode group, the electrodes 67, adpots negative potential. Initiation of the charging could, however, be provided for by arranging an electrete 89 adjacent one or more of the jets, causing a charge distribution therein by electrical influence.

Thus, in the chamber a series of zones are created in which, with the polarity of the electrodes 66 and 67 mentioned above, the drops are negatively charged in the zones of the jets originating from nozzles 75, while in the intermediate zones the drops originating from the nozzles 76 carry a positive charge. When flowing through the zones of mutually opposite polarities, the drops of opposite polarities and the dust particles are mutually attracted and are carried along with larger drops of opposite polarity originating from the nozzles, and are carried therewith to an opposite electrode, where in each stage at least part of the dust particles flow downwardly along the electrodes to be dispelled through a drain 90. Some part of the dust particles will, when the drops hit on the electrodes, be again distributed in the chamber adjacent the electrode. By choice of number of jets and corresponding charge zones in the chamber the gas will leave the outlet 62 of the apparatus with a desired degree of purity.

I claim:
1. In a gas scrubber apparatus comprising an enclosure providing therewithin a gas duct extending between a gas inlet and a gas outlet, and ejection means for ejecting gas washing liquid into said duct, the improvement comprising at least one first electrically conducting body and at least one second electrically conducting body located at a distance from the first electrically conducting body, said ejection means being arranged to eject at least two individual jets of gas washing liquid, said ejection means and said first and second electrically conducting bodies being electrically insulated from each other, the ejection means and the electrically conducting bodies being mutually arranged to bring a first one of said jets, when ejected, to first pass by a first electrically conducting body at a distance therefrom and to bring at least part thereof thereafter to impinge upon said second electrically conducting body, and to bring a second one of said jets to first pass by said second electrically conducting body at a distance therefrom and to bring at least part thereof thereafter to impinge upon said first electrically conducting body, the jets and said first and said second electrically conducting bodies together constituting a Kelvin liquid influence machine, said gas duct extending through a space traversed by at least one of said jets after having passed at least one of said electrically conducting bodies.

2. A gas scrubber apparatus according to claim 1, comprising an electrically conducting member arranged within the duct in a region thereof between said gas inlet and a first space within the duct to be traversed by a jet after having last passed one of said first and second electrically conducting bodies, said member being electrically insulated from said enclosure and electrically connected to the other one of said first and second electrically conducting bodies to constitute a corona discharge electrode.

3. A gas scrubber apparatus according to claim 1, comprising a duct portion enclosed by an electrically conducting wall, said wall being electrically insulated from said enclosure and having apertures for allowing at least one jet to enter said duct portion, said wall further constituting part of one of said first and second electrically conducting bodies.

4. A gas scrubber apparatus according to claim 1 comprising first and second electrically conducting bodies constituting at least two rows of at least two electrode members each said rows extending along opposite sides of said duct in the direction from the inlet to the outlet of said duct and at least two mutually adjacent electrode members of each row being electrically interconnected and arranged at a distance from each other to allow a jet to pass through a gap between them, said ejecting means being arranged to eject separate jets of liquid from behind said electrode members through at least one gap between electrode members of each row into the space between said rows of electrode members in a direction toward an electrode member located at the opposite side of the duct.

5. A gas scrubber apparatus according to claim 1, in which said first and said second electrically conducting bodies each comprise a first electrically conducting electrode member and a second electrically conducting electrode member, said first and second electrode members being electrically interconnected to consitute said electrically conducting bodies, the first electrode member of each of said electrically conducing bodies being mounted to be passed by each at least one jet of liquid and the second electrode member of each of said electrically conducting bodies being mounted to be impinged upon by at least part of a jet passing the first electrode member of the other electrically conducting body.

6. A gas scrubber apparatus according to claim 1, in which an electrode is mounted adjacent the path of a jet.

7. A gas scrubber apparatus according to claim 1 in which said ejection means is electrically connected to the enclosure of the apparatus, said first and said second electrically conducting bodies being insulated from said enclosure.

References Cited

UNITED STATES PATENTS

| | | | |
|---|---|---|---|
| 2,357,354 | 9/1944 | Penney | 55—138 |
| 2,357,355 | 9/1944 | Penney | 55—107 |
| 2,742,581 | 4/1956 | Rhodes | 310—5 |
| 2,778,443 | 1/1957 | Yereance | 55—103 X |
| 2,881,335 | 4/1959 | Vonnegut | 310—5 |
| 2,949,168 | 8/1960 | Peterson | 55—107 |
| 3,122,660 | 2/1964 | Giannini et al. | 310—2 X |
| 3,193,912 | 7/1965 | Polin | 317—262 X |
| 3,225,225 | 12/1965 | Wattendorf et al. | 310—6 |

FOREIGN PATENTS

| | | |
|---|---|---|
| 300,589 | 9/1917 | Germany. |
| 329,422 | 11/1920 | Germany. |

HARRY B. THORNTON, *Primary Examiner.*

DENNIS E. TALBERT, JR., *Assistant Examiner.*

U.S. Cl. X.R.

55—122, 136, 139; 310—5